(12) United States Patent
Ritz

(10) Patent No.: US 8,297,755 B2
(45) Date of Patent: Oct. 30, 2012

(54) LASER PROJECTOR WITH ALERTING LIGHT

(75) Inventor: Arnd Ritz, Heinsberg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 499 days.

(21) Appl. No.: 12/440,594

(22) PCT Filed: Sep. 7, 2007

(86) PCT No.: PCT/IB2007/053603
§ 371 (c)(1),
(2), (4) Date: Dec. 16, 2009

(87) PCT Pub. No.: WO2008/032244
PCT Pub. Date: Mar. 20, 2008

(65) Prior Publication Data
US 2010/0073580 A1    Mar. 25, 2010

(30) Foreign Application Priority Data
Sep. 14, 2006  (EP) .................................. 06120640

(51) Int. Cl.
*G03B 21/00* (2006.01)
(52) U.S. Cl. ............... 353/31; 353/20; 353/30; 353/33; 353/34; 353/38; 353/39; 353/82; 353/98; 353/99; 353/119; 353/122; 372/24; 372/29.01
(58) Field of Classification Search .............. 353/20, 353/30, 31, 33, 34, 38, 39, 50, 82, 85–87, 353/98, 99, 119, 122; 372/24, 29.01, 9, 26, 372/99, 101; 348/744, 745, 739; 349/5, 349/7, 8, 9
See application file for complete search history.

(56) References Cited

U.S. PATENT DOCUMENTS

| | | | | |
|---|---|---|---|---|
| 3,988,059 | A | * 10/1976 | Johnson | ............ 353/122 |
| 6,002,505 | A | * 12/1999 | Kraenert et al. | ........ 359/196.1 |
| 6,183,092 | B1 | * 2/2001 | Troyer | ................ 353/31 |
| 6,428,169 | B1 | * 8/2002 | Deter et al. | ............. 353/20 |
| 6,575,581 | B2 | 6/2003 | Tsurushima | |
| 6,636,274 | B1 | * 10/2003 | Mazda et al. | ............. 348/745 |
| 6,650,407 | B2 | * 11/2003 | Jamieson et al. | ....... 356/141.1 |
| 6,911,647 | B2 | 6/2005 | Urbon et al. | |
| 7,144,117 | B2 | * 12/2006 | Kojima | ................. 353/37 |
| 7,410,260 | B2 | * 8/2008 | Mehrl | .................. 353/28 |
| 7,679,579 | B2 | * 3/2010 | Minatogawa | ........... 345/32 |
| 2001/0010514 | A1 | * 8/2001 | Ishino | ................. 345/158 |
| 2005/0024595 | A1 | 2/2005 | Suzuki | |
| 2005/0035943 | A1 | 2/2005 | Kojima | |
| 2005/0110954 | A1 | * 5/2005 | Kojima | ................. 353/31 |
| 2005/0128578 | A1 | 6/2005 | Sugawara et al. | |
| 2006/0001836 | A1 | 1/2006 | Kobori et al. | |
| 2006/0291027 | A1 | * 12/2006 | Taniguchi | ............. 359/204 |

FOREIGN PATENT DOCUMENTS

| | | |
|---|---|---|
| DE | 4325139 C1 | 12/1994 |
| EP | 1513008 A1 | 3/2005 |
| JP | 2004243794 A | 9/2004 |
| JP | 2005114985 A | 4/2005 |
| JP | 2005309162 A | 11/2005 |

* cited by examiner

Primary Examiner — Georgia Y Epps
Assistant Examiner — Sultan Chowdhury

(57) ABSTRACT

A projector with a laser light source projects an image. In order to reduce the risk for a person to be exposed to harmful levels of laser light, the projector also projects a time-variant alerting image into an alerting region. Alerting region is arranged outside of the projection region. The alerting image is of a wave length visible to the human eye, and of an intensity of eye-safe level.

13 Claims, 6 Drawing Sheets

LASER PROJECTOR WITH ALERTING LIGHT

The invention relates to a projector comprising a laser light source and a method for operating a projector.

Video projection devices are used to project an image onto a screen. Currently, mainly high intensity discharge (HID) lamps are used as a light source. The light from this light source is modulated according to the image that is to be displayed, and projected into a projection region. Different means are used for modulation, e.g. LCD light valves, digital micro-mirror devices (DMD), or LCOS.

It is currently contemplated to use laser light sources for such projectors. Laser light sources have the advantage of very high intensity, such that high quality video projection will be possible, and a bright projected image may be obtained.

On the other hand, projectors will not only be operated by skilled technicians in a controlled environment, e.g. in a cinema. As projectors become largely available, they will also be operated by technically untrained individuals.

Due to the high light output obtainable from laser light sources, laser projectors may deliver up to several watts of light radiation per primary color. This is an amount of laser radiation, which under adverse conditions can be harmful to people, especially to the human eye.

US 2005/0024595 discloses a laser projector using an RGB (red, green, blue) laser as a projecting light source. The light from this light source is scanned over a projecting area onto a screen to thereby project an image. In order to implement a safety function that can reliably detect entrance of an entering object, such as a human body, there is provided a scanning monitoring device. The monitoring device performs monitoring at along at least a part of the outer edges of the projection area using a monitoring wave. An example of such a monitoring wave is a pulse laser with a peak output of about 20 W. An object may be detected by calculating the travel time of a laser light pulse. The monitoring wave is scanned by a rotating mirror to be applied to the outer edges of the projecting area. If the monitoring device detects that the monitoring wave is intercepted, e.g. by a human body, the light projection may be reduced or interrupted.

It is an object of the present invention to provide a projector and a method for operating a projector to reduce the risk for a person to be exposed to harmful levels of laser light.

This object is solved by a projector according to claim 1 and method according to claim 11. Dependent claims relate to preferred embodiments of the invention.

According to the invention, a projector comprises a laser light source for emitting the light used for image projection. The light from the laser light source is modulated according to the desired image. The image will typically be supplied as a time-dependent image signal, which may be analog or digital. In the present context, "modulation" is understood as the step of modifying the light to introduce the image information.

As will become apparent, the projector may be of a scanning type, where at least one beam is scanned over the projection region. In this case, modulation relates to time-dependent variation of the light intensity and/or color, according to the present scanning position of the projection beam, and in dependence on the specific part of the image currently being projected. Alternatively, the projector may be of a light valve type where the light from the laser light source is used to obtain a light bundle to project the whole image (or at least a significant part thereof) at the same time. In this case, modulation relates to a light valve which selectively lets parts of the light bundle pass on, depending on the image that is to be projected.

The projections means serves to direct the light, including the image information, into the projection region. Projection means may include a scanning mirror (in the case of a scanning-type projector), or a projection lens.

In operation, the projector projects the image into the direction of a projection region. On a screen, which will typically be arranged at least substantially perpendicular to the optical axis, the projection region will typically be a rectangular area.

According to the invention, the projector comprises means for creating and projecting an alerting image which has the purpose of alerting a person approaching the projection region. The inventor has recognized that one reason for the specific risk involved with high-intensity projectors is that during operation of a projector, a region of the room is filled with potentially hazardous radiation, which cannot be detected by individuals as long as they are outside of this region. So, a person approaching the projection region may be completely unaware of the danger.

In order to reduce the risk that an individual may enter the projection region totally unprepared, the alerting light is used. In this way, the same agent that causes the threat, namely light, is proposed to be used as an alerting agent. In order to be perceived by the human eye, the light generating the alerting image (alerting light) is of a wave length in the visible range. The alerting light is of an intensity of eye-safe level, but visible to the human eye. It is preferred that the alerting light is of an intensity, which produces glare and annoyance to a person looking into the beam. This alerting light makes individuals, that approach the projection region, on time aware of the danger and hold them back or gives them time to turn away their look before entering the projection region.

The alerting light is directed into an alerting region, which is outside of the projection region. Preferably, the alerting region is located adjacent to the projection region. It is further preferred that the projection region is at least partly surrounded by the alerting region, so that all directions from which a person may enter may be covered. The alerting light will not substantially reduce contrast of the projected image, as it will not be directed in the projection region. It merely contributes to the overall level of the surrounding light.

The alerting light may be generated and used in a plurality of different ways. Although preferably the alerting light is also laser light, it is possible to generate the alerting light by a different type of light source, e.g. LED. The alerting light may comprise one or more beams to be scanned over the alerting region. Alternatively, the alerting light may comprise one or more light bundles directly illuminating the alerting region (or substantial portions thereof) at the same time. The alerting light may create an alerting image within the alerting region. The alerting image may be constant over time, so that an alerted viewer perceives a constant alerting light, or may alternatively be time-variant so that the viewer is alerted e.g. by a pulsation. Further, the alerting image may be substantially constant over the alerting region, so that substantially the same illumination is provided in each part of the alerting region. Alternatively, the alerting image may comprise regions of high and regions of lower intensity.

It is possible to constantly leave the alerting light on. In this case, the alerting region outside of the projected image will be illuminated by the alerting light. Due to the relatively low intensity of the alerting light, the illumination caused outside of the projection region may not be perceived as disturbing. Alternatively, according to a preferred embodiment of the invention, a detection device is provided for detecting the presence and/or movement of objects within a detection region. The detection region may be identical to the alerting region, although this is not necessary. A controlling means is operable to only activate the alerting light if the detecting device indicates a presence and/or movement of an object. A plurality of different types of detection devices are known, which may be used in connection with a laser projector. For example, a laser range finder as disclosed in the above discussed US 2005/0024595 may be used.

According to an alternative embodiment of the invention, the alerting image may be even used to enhance the way the projected image is perceived. The alerting region may be subdivided into a plurality of sections, for which the illumination may be independently controlled. The number of sections of the alerting image will typically be low, e.g. 2-16. For example, one such region may be designed adjacent to each of the four edges of a rectangular projection region. For each of the sections of the alerting region, a corresponding section of the projection region is chosen, which is located adjacently thereto. During operation, the intensity and/or the color of each section of the alerting image is chosen dependent on the intensity and/or color of the adjacent section of the projection region. Thus, the alerting image created outside of the projection region is perceived as extending the projected image. While the alerting image contains very little actual image information, e.g. only the equivalent of 2-16 pixels, and while the alerting light will have a significantly lower intensity than the light projecting the image, this will still serve to improve the perceived image.

As explained above, the projector may be of the scanning type. According to an embodiment of the invention, it comprises a movable reflection means to reflect a first laser light beam into the direction of a projection region in a raster scanning manner.

For a projector of the scanning type, according to a preferred embodiment, the alerting light may be generated by at least one separate laser light source. The light from this one, or preferably more laser light sources may be reflected by the same movable reflection means as the first laser light beam. This eliminates the need for a separate scanning means for the alerting light, thereby reducing cost.

Alternatively, as explained above, a 2D light valve unit may be used to modulate the light from the laser light source to create a first laser light bundle comprising the image. According to a preferred embodiment for this type of projector, a lens is provided for projecting the first bundle into the direction of the projection region. The first bundle may be projected into a central portion of the image plane of the lens. Here, it may be preferable that only the central portion, not extending up to the edges of the lens, is used because in this region there are less optical aberrations. It is proposed to project the alerting light also through a peripheral portion of the lens, preferably up to the edges of the lens. Here, due to the fact that the alerting light will serve its purpose even with poor image quality, optical aberrations may more easily be tolerated.

According to a further preferred embodiment of a light valve projector, a digital mirror device is used. The digital mirror device comprises a plurality of switchable micro-mirrors used to modulate the light. In projectors of this type, the light valve is usually overfilled with light, e.g. the light bundle directed onto the digital mirror device is spread out further than necessary. This may advantageously be used to create the alerting light from the same light as the first light bundle used for projection. At least one reflective surface may be located such that light directed outside of the digital mirror device (e.g. into a region located adjacent to the digital mirror device with regard to the beam direction) is reflected at the surface and projected into the alerting region. Preferably, the same projections means, e.g. projection lens is used. The reflective surface is shaped and arranged according to the desired position and size of the alerting region. The reflectivity of the reflective surface is chosen according to the desired intensity of the alerting light. The reflective surface may be arranged in different places, as long as it is located—with regard to the beam direction—adjacent to the digital mirror device.

The above and other objects, features and advantages of the present invention will become apparent from the following description of a preferred embodiment, in which.

Figure 8:
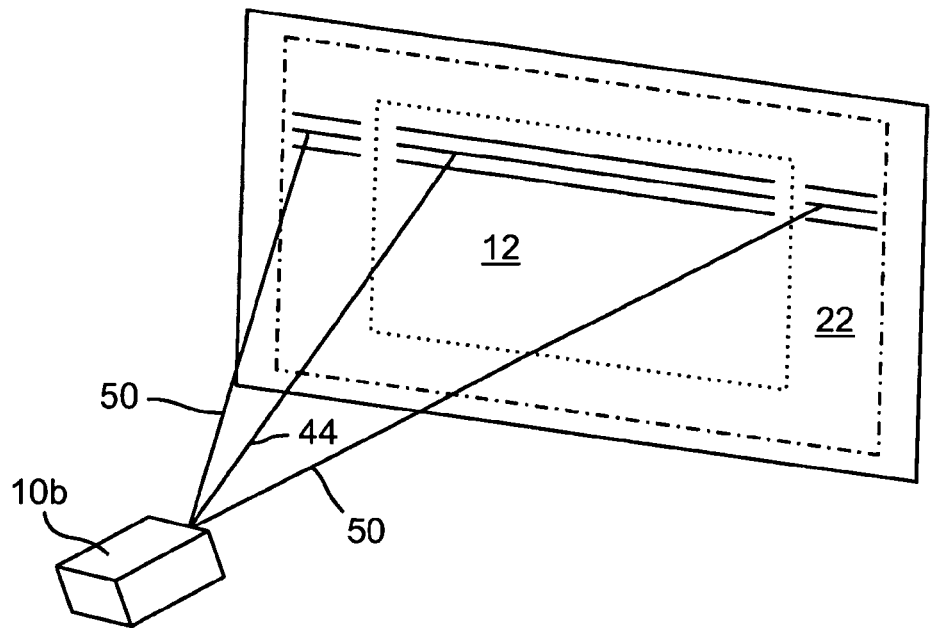
FIG. 8 shows a symbolical, perspective representation of a scanning type projector projecting an image.
Figure 9:
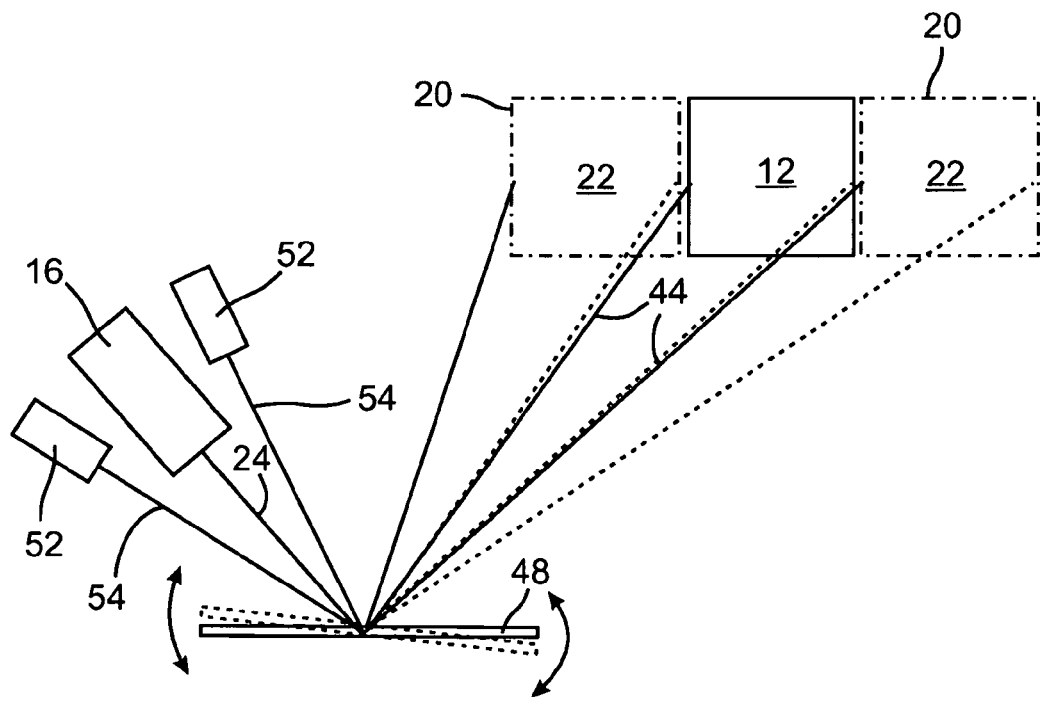
Figure 10:
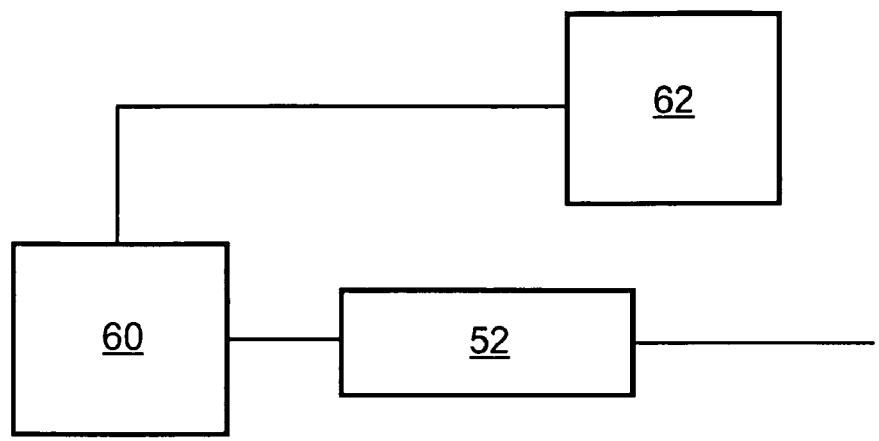
Figure 11:
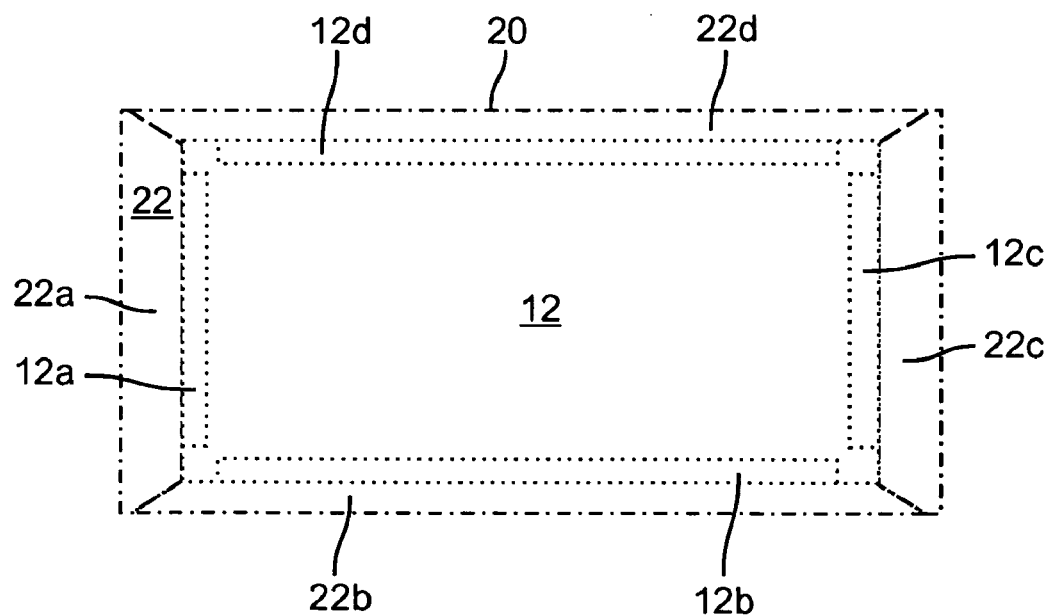

FIG. 9 a symbolical representation of a sixth embodiment of a beam path with the scanning projector from FIG. 8;

FIG. 10 a symbolical representation of a part of a projector with a detection unit;

FIG. 11 a diagram of an image and corresponding alerting image.

Figure 1:
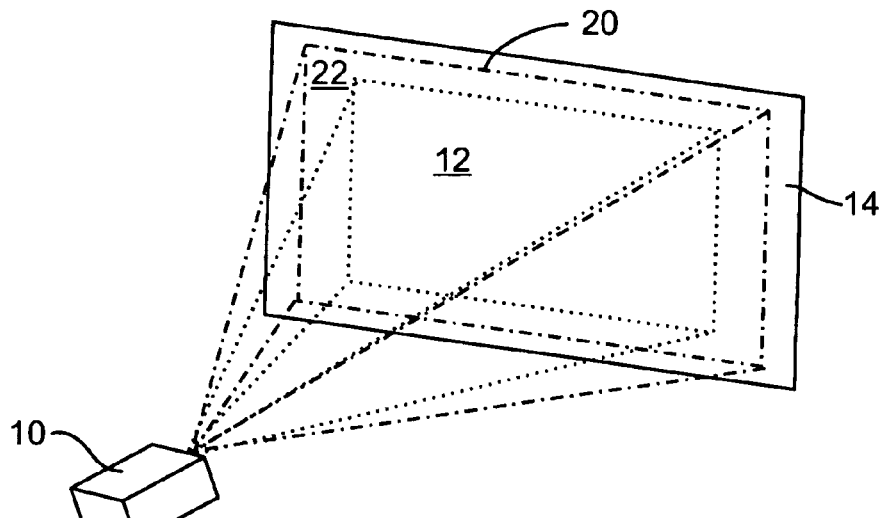
FIG. 1 shows a symbolical, perspective representation of a light valve type projector projecting an image.

FIG. 1 shows a projector 10 projecting an image 12 onto a screen 14. The image 12 occupies a rectangular area of screen 14, indicated in FIG. 1 by dotted lines.

Figure 2:
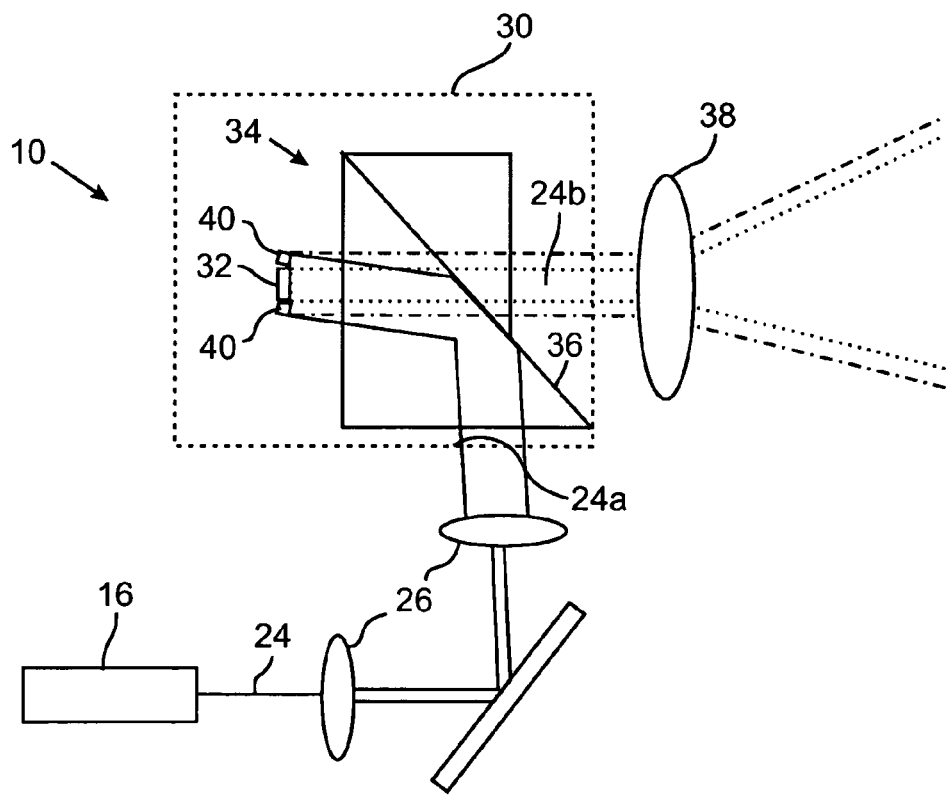
FIG. 2 shows a symbolical representation of a first embodiment of a beam path within the projector from FIG. 1.

As shown in FIG. 2, illustrating a first embodiment of the projector 10, the light of a laser light source 16 is modulated according to an image signal and projected onto screen 14.

The high light intensity generated within the area of the projected image 12 may cause eye damage to a person entering into the space (indicated by dotted lines in FIG. 1) between the projector 10 and the screen 14, if the projected light falls directly into this person's eyes.

In order to provide a visible warning for anyone before entering this space, there is provided an alerting region 20, indicated in FIG. 1 by dot and dash lines. The alerting region 20 corresponds to an outer frame around the image 12 and is bordered by—in the example shown—a rectangular outer border. To the inside, the alerting region 20 extends up to the borders of the image 12, but does not overlap.

As shown in FIG. 1 by dash-dotted lines, projector 10 generates and projects an alerting image 22 into the alerting regions 20. The alerting image 22 is intended to alert a person entering the space between projector 10 and the screen 14 about the potential hazard. The light projected into alerting zone 20 is visible light, so that a person entering is effectively warned. The intensity is high enough to cause glare and annoyance to the human eye. This helps to achieve an effective warning function, so that a person entering will turn away his eyes immediately. However, the light is of eye-safe level, so that direct exposure of the human eye to the light projected into the warning region 20 will not cause eye damage.

The light levels in the warning region have to conform to the limits set in international standards IEC-60825 and CIE S009. In a preferred embodiment, the light levels in the warning region are chosen to be 40-90% of the maximum allowed intensity for the chosen wavelength.

FIG. 2 shows in principal the operation of projector 10. As laser beam 24 generated by laser light source 16 is expanded by lenses 26 to an expanded beam 24a.

The beam 24a is modulated in a two-dimensional light valve unit 30. As shown in FIG. 2, light valve unit 30 comprises a digital mirror device 32 and a TIR prism 34. The TIR prism 34 has a boundary surface 36 where the incident, expanded laser light (bundle) 24a is reflected onto the digital mirror device. As visible in FIG. 2, the light valve is overfilled, i.e. the light bundle 24a is expanded to be so wide that not only digital mirror device is completely illuminated, but that also significant parts of the light are directed adjacent to the digital mirror device.

The digital mirror device, as known to the skilled person, operates by selectively moving micro reflectors in its plane, so that those parts of the incident light bundle 24a which are reflected by micro reflectors in a first position are redirected into the TIR prism 34, but at a slightly changed angle. This modulated light bundle 24b is, due to its angle, not reflected at surface 36, but traverses TIR prism 34. On the other hand, those parts of the incident light bundle 24a which fall onto micro reflectors in a second position are reflected back into the TIR prism at a different angle (not shown) so that they are reflected by surface 36 and do not traverse the TIR prism 34. Each micro reflector corresponds to one pixel of the image 12. In this way, the generated modulated light bundle 24b contains the complete information of the image that is to be projected. The light bundle 24b is projected by a projection lens 38.

In the first embodiment according to FIG. 2, the light used for the alerting image 22 originates also from the same laser light source 16. Parts of the light bundle 24a are used to generate the alerting light. To achieve this, reflectors 40 are arranged adjacent to the digital mirror device 32. The reflectors 40 have a front reflective surface, that is arranged at an angle so that reflected light traverses TIR prism 34. Due to the overfill of the broad light bundle 24a, the reflective surfaces are illuminated. Depending on the reflectivity of these surfaces, only a reduced amount of light is reflected.

It should be noted that the DMD device 32 is usually implemented as a chip including a packaging with a window. The actual reflecting surface with the micro reflectors is positioned inside the window.

What is depicted with reference sign 32 in the drawings is only this reflective surface. In order to achieve an alerting image that is positioned directly adjacent the projected image, the reflectors 40 are preferably arranged directly adjacent to the reflective surface. For example, the frame of the window of the DMD chip may be coated to provide a reflective surface surfing as a reflector 40.

The reflective surface may be obtained by vapor deposition of aluminum on a suitable surface. The reflectivity may be chosen in order to achieve the desired light levels, e.g. by controlling the surface roughness accordingly. In a further preferred embodiment, dichroic mirrors are provided on the surfaces. Such dichroic mirrors may easily be adjusted to achieve any desired reflectivity.

As shown in FIG. 2 with dash-dotted lines, the light bundles reflected from the reflectors 40 traverse the TIR prism 34 adjacent to the central light bundle 24b. Lens 38 projects the complete light bundle comprising a modulated light bundle 24b for generating the image 12 as well as the light reflected from the reflectors 40 to illuminate the alerting region 20. Typically, the lens 38 is round. The image 12 is projected only through a central part of the lens, which does not extend up to the edges. The alerting image 22 is projected through a larger portion of the lens, including a peripheral part of the lens, in the preferred example extending up to the edges. Here, optical aberrations are more likely to become noticeable. However, since the alerting image requires no exact projection, the peripheral part of the lens 38 may be used here.

Thus, FIGS. 1 and 2 show a projector 10 equipped with means for creating and projecting an alerting light which has very little additional parts, as compared to the projector without the alerting light. Only reflectors 40 are provided, which make use of the light overfill, which will already be present in many constructions. Thus, the alerting function according to the invention may be achieved with extremely little additional cost.

It should be noted that for purposes of clarity, FIG. 2 only shows reflectors 40 on two opposite sides of the digital mirror device 32. In order to generate an alerting image 22 forming a frame around image 12 as indicated in FIG. 1, it is clear to the skilled person that corresponding reflectors are to be arranged around all edges of the digital mirror device 32. Also, a way to achieve the desired colors was not described above. As known to the skilled person, this may be achieved by time-sequential color rendering, where the color of light beam 24 is sequentially changed over time, e.g. according to an RGB scheme, and the light valve 30 operated according to these color cycles.

Figure 3:
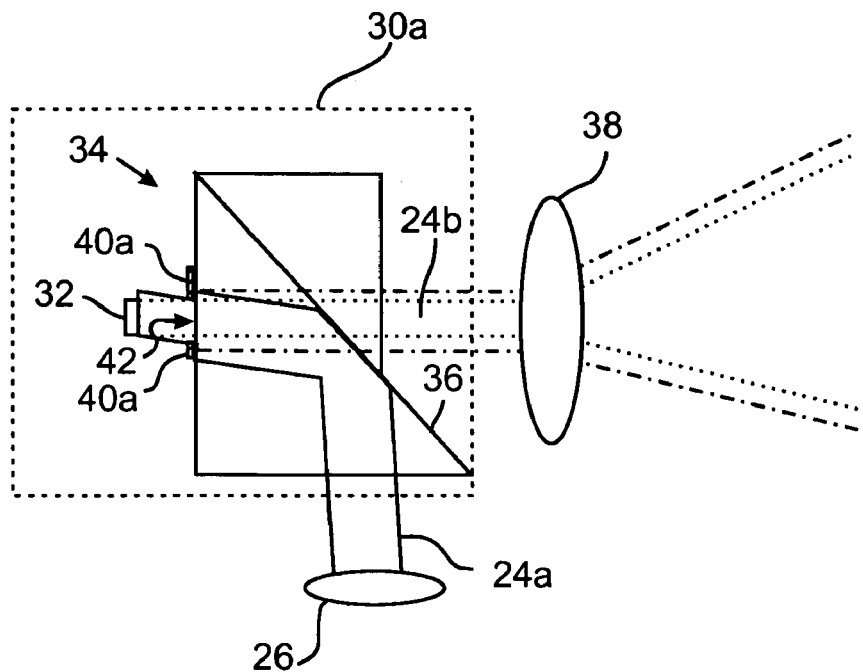
FIG. 3 shows a symbolical representation of a second embodiment of a beam path of the projector from FIG. 1.

FIG. 3 shows a part of a second embodiment of the projector 10. The second embodiment largely corresponds to the first embodiment. Like numerals refer to like parts. In the following, only the differences will be further explained.

In contrast to the first embodiment, the reflectors 40 are not provided next to the digital mirror device 32. Instead, they are provided as reflective coatings 40a on the surface of the TIR prism 34, which faces the digital mirror device 32. The reflective surfaces 40a leave a window 42 so that both the incident light bundle 24a and the modulated light bundle 24b can pass freely. Still, the reflective surfaces 40a are located—with regard to the beam direction of the incident light bundle 24a—adjacent to the digital mirror device 32, so that parts of the light bundle 24a, which do not fall onto digital mirror device 32, are reflected there.

The second embodiment thus also generates an alerting image 22 with extremely little additional parts.

Figure 4:
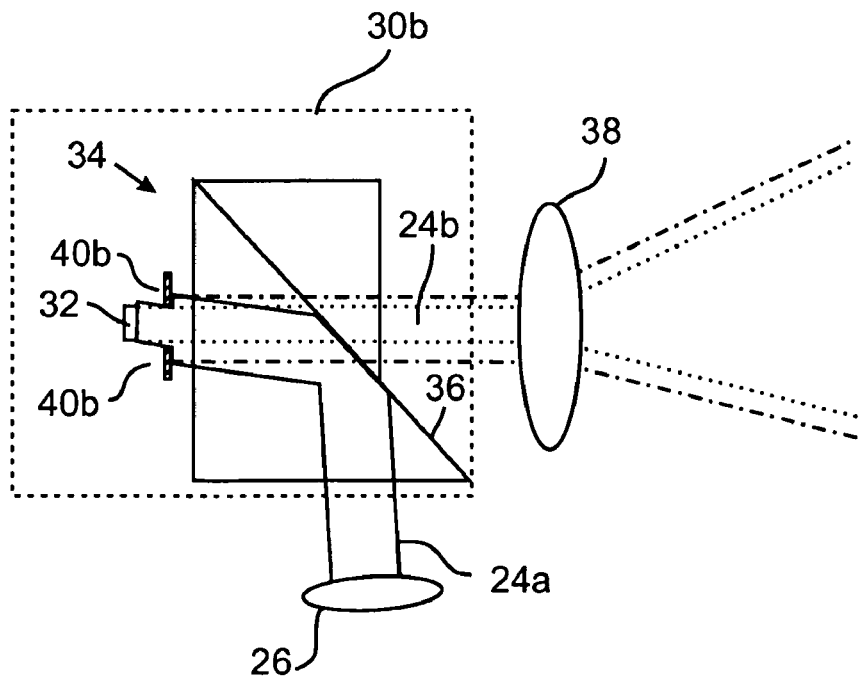
FIG. 4 shows a symbolical representation of a third embodiment of a beam path of the projector from FIG. 1.

FIG. 4 shows a part of a third embodiment of the projector 10. The third embodiment largely corresponds to the first embodiment. Like numerals refer to like parts. In the following, only the differences will be further explained.

In contrast to the above described first and second embodiments, in the third embodiment parts of the incident light bundle 24a are reflected by separate reflectors 40b arranged in the plane between the digital mirror device 32 and the TIR prism 34.

Figure 5:
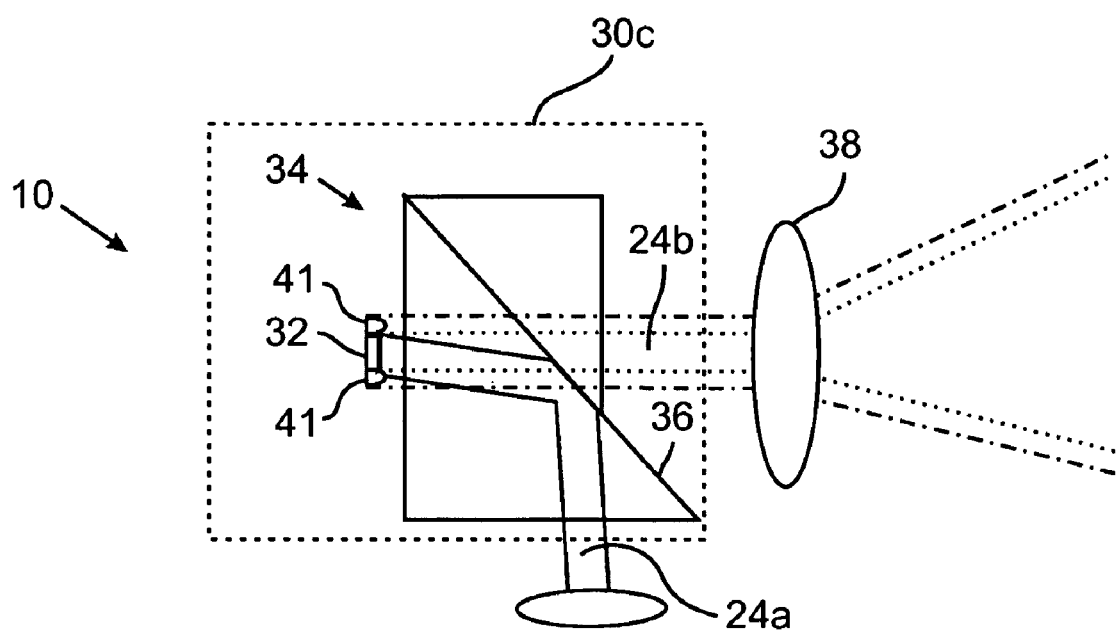
FIG. 5 shows a symbolical representation of a fourth embodiment of a beam path of the projector from FIG. 1.

FIG. 5 shows a part of a fourth embodiment of the projector 10.

In contrast to the above embodiments, the alerting image 22 is not generated by reflection of the incident light bundle 24a, but by separate lighting means. In the embodiment shown, LEDs 41 are provided adjacent to the digital mirror device 32 to generate the light used for the alerting image 22. LEDs positioned around the DMD device 32 which may be operated independently to generate a desired alerting image.

Figure 6:
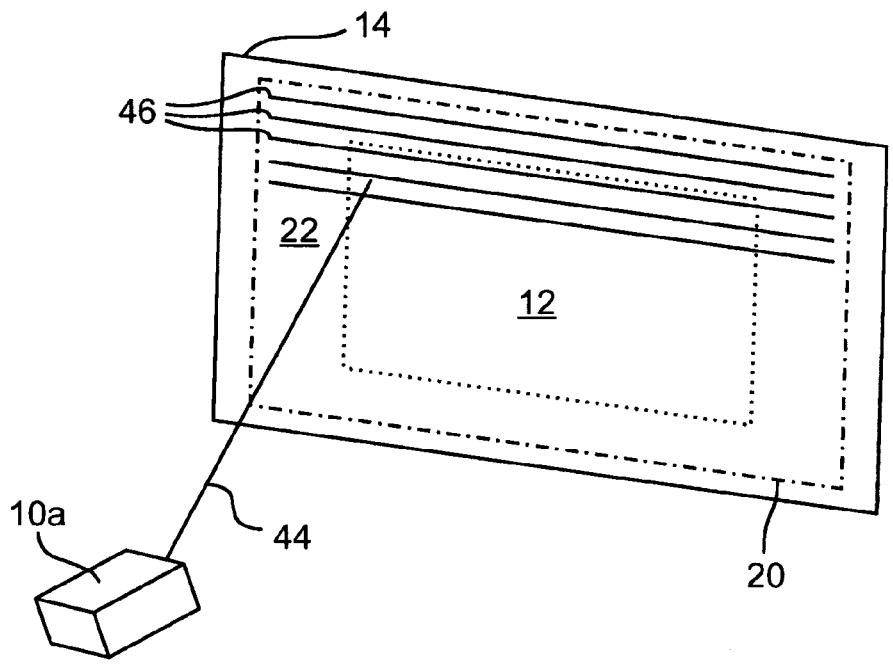
FIG. 6 shows a symbolical, perspective representation of a scanning type projector projecting an image.

FIG. 6 shows a second type of a projector 10a. As in the first embodiment, the projector 10a projects onto a screen 14 an image 12 and also an alerting image 22 into a bordering alerting region 20.

In contrast to the projector 10 from the first embodiment, the projector 10a works in a scanning manner. While the projector 10 from the first embodiment projects a modulated light bundle 24b which at the same time projects the whole of image 22, the scanning projector 10a only projects a single laser light beam 44 onto the screen 14 at each time. The light beam 44 is moved over the screen 14 in a raster scanning manner (indicated by scan lines 46).

Figure 7:
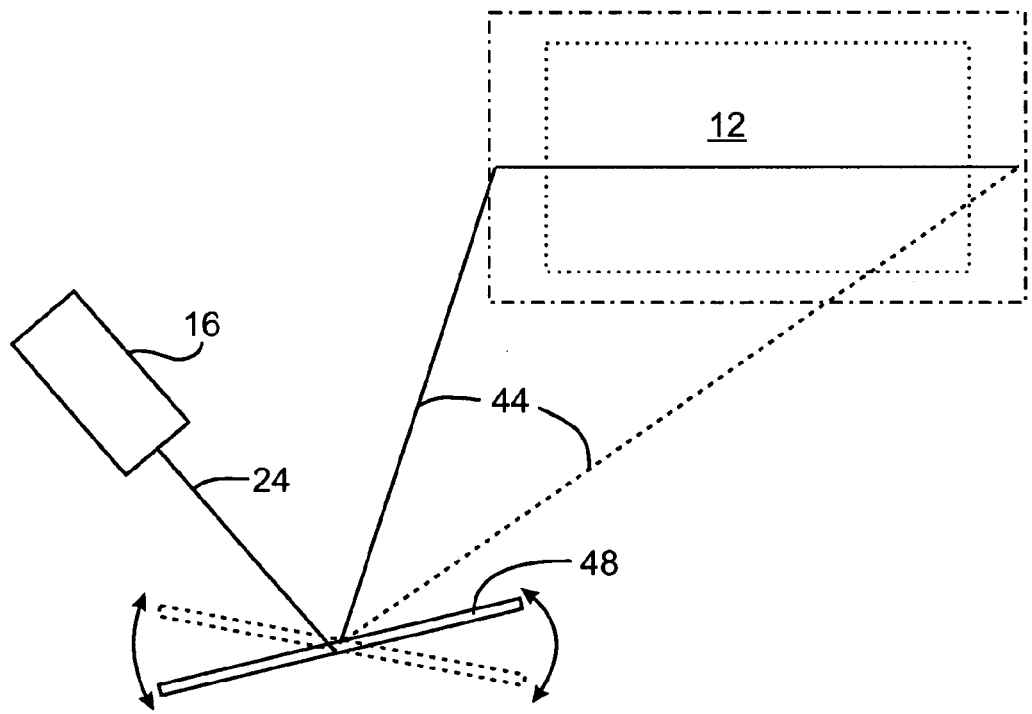
FIG. 7 shows a symbolical representation of a fifth embodiment of a beam path within a scanning projector.

FIG. 7 shows in principal how scanning is achieved. A laser light source 16 emits a laser beam 24 that is reflected by a movable mirror 48, so that it is reflected as scanning beam 44. As indicated by arrows, mirror 48 can be pivoted so that scanning beam 44 is moved over the entire width of the projection area. In order to generate the image 12 that is to be projected, the light from laser light source 16 is modulated in a time-variant manner, such that in each moment the emitted laser beam 24 has the desired intensity that is to be projected to the spot to which scanning beam 44 is currently targeted.

As known to the skilled person, swiveling of the mirror 48 is always effected with a certain overshoot. In order to achieve exact positioning of scanning beam 44, mirror 48 is tilted not only within an angular range to target the borders of the area of projected image 12, but moves beyond this angular range to both sides. However, outside of the area of the image 12, the projection accuracy may be degraded, due to inertia effects of the moving mirror 48.

According to the fifth embodiment of the invention, this is employed for generating, as described in connection with FIG. 1, not only the projection of an image 12, but also a projection of an alerting image 22. To create the alerting image 22, the angular range of the mirror 48 outside of image 12 is used. Here, the possibly poor accuracy is no major disadvantage, because the alerting image does not require high accuracy.

During the time intervals where the moving mirror 48 directs the laser beam 44 into the alerting region 20, outside of the image 12, the laser light source 16 is operated to emit a laser beam 24 of greatly reduced intensity. In this way, the desired low-intensity alerting image 22 is created.

The fifth embodiment makes it possible to create this alerting image around the image area 12 without any additional parts.

FIG. 8, FIG. 9 illustrate a sixth embodiment of the invention. The sixth embodiment largely corresponds to the fifth embodiment and also employs a scanning type laser projector. As in the sixth embodiment, the image 12 is projected using a first laser beam 44. However, in the sixth embodiment further laser beams 50 are used to project the alerting image 22 also in a raster scanning manner.

FIG. 9 shows how the additional laser beams 50 may be generated and projected. Additional to the primary laser source 16, secondary laser sources 52 are provided to generate incident light beams 24 directed to the moving mirror 48. Now, as the mirror 48 moves to direct the laser beam 24 as reflected laser beam 44 over the image 12, the secondary laser beams 54 are also reflected to move over the adjacent alerting regions 20 in a raster scanning manner. As primary laser source 16, also secondary laser sources 52 are operated in a time-variant way so that a desired alerting image 22 may be displayed in a raster scanning manner.

It should be noted that for purposes of clarity, FIG. 7 (as well as FIG. 9) only shows one direction of a raster scan. As known to the skilled person, a full raster scan needs to be effected in both x- and y-direction, as may be achieved by a further mirror or a further pivot axis of the movable mirror 48.

In order to achieve a colored image in the raster scanning type projector, it is possible to use three scanning beams of e.g. RGB color, and to superimpose the correspondingly generated images.

For all of the above embodiments, it is possible to activate the alerting image 22 only if an object is detected within a detection region. In a preferred embodiment, the detection region is identical to the alerting region 20. FIG. 10 shows a corresponding embodiment, where secondary laser light source 52 is controlled by a controlling unit 60. The controlling unit 60 receives the output of a detector unit 62. The detector unit 62 continuously scans the alerting region 20 to monitor if an object is present between the projector 10 and the screen 14. Only if the detector unit 62 detects the presence of an object there, the auxiliary laser light source 52 is activated to generate light that is projected as an alerting image into the alerting region 20.

In an alternative embodiment, the alerting light is continuously switched on during operation of the projector 10, and even used to enhance the way the image 12 is perceived. As shown in FIG. 11, the alerting region 20 may be subdivided into four sub-regions 22a, 22b, 22c, 22d. Each of the sub-regions is arranged adjacent to an edge of the image 12. Within the image 12, edge regions 12a, 12b, 12c, 12d are defined. During operation, an average brightness and color for each of the edge regions 12a, 12b, 12c is determined. The alerting image 22 is projected such that in each sub-region a constant image with a color is generated, that corresponds to the average color of the neighboring edge region. The intensity of the alerting image in each sub-region may either be constant, or may vary proportionally to the average intensity in the associated edge region. In each case, however, the intensity in the alerting region 20 will be substantially less than in the area of the image 12.

The invention has been illustrated and described in detail in the drawings and foregoing description. Such illustration and description are to be considered illustrative or exemplary and not restrictive; the invention is not limited to the disclosed embodiments.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Projector comprising:
    a laser light source (16),
    modulation and projections means for modulating the light from said laser light source (16) and projecting said light into a direction within a projection region to generate a projected image (12) filling said projection region,
    and means for projecting an alerting image (22 ) into a direction of an alerting region (20) outside of said projection region (12), where the alerting light used for generating said alerting image (22) is of a wavelength visible to the human eye, and of an intensity of eye-safe level,
    wherein said alerting light used for generating said alerting image (22) originates from said laser light source.

2. Projector according to claim 1, where
    said alerting region (20) is located adjacent to said projection region (12).

3. Projector according to one claim 1, said projector further comprising
- a detection device (62) for detecting the presence and/or movement of objects within a detection region,
- and controlling means (60) operable to only activate said alerting image if said detection device (62) indicates a presence and/or movement of an object within said detection region.

4. Projector according to claim 1, where
- said alerting light is a laser light beam (50) or bundle of an intensity high enough to cause glare to the human eye.

5. Projector according to claim 1, where
- said projection region (12) comprises a plurality of sections (12a, 12b, 12c, 12d), and said alerting region (20) comprises a plurality of sections (22a, 22b, 22c, 22d), each section of said alerting region (20) being located adjacent to at least one of said sections (12a, 12b, 12c, 12d) of said projection region (12),
- where the intensity and/or color of each section (22a, 22b, 22c, 22d) of said alerting image (22) is dependent on the intensity and/or color of said adjacent section (12a, 12b, 12c, 12d) of said projection region (12).

6. Projector according to claim 1, where
- said laser light source (16) is operable to modulate an emitted laser beam (24),
- where said projector (10a, 10b) comprises a movable reflection means (48) to reflect said laser light beam (24) into a direction within a projection region (12),
- and where said movable reflection means (48) is operable to reflect said laser light beam (24) into the direction of said projection region (12) in a raster scanning manner.

7. Projector according to claim 6, where
- said means for projecting said alerting image comprise at least one separate laser light source (52),
- where light emitted by said separate laser light source (52) is reflected by the same movable reflection means (48) as the light used to project said image (12).

8. Projector according to claim 1, said projector further comprising
- a light valve unit (30, 30a, 30b) to modulate the light (24) from said laser light source (16) to create a first laser light bundle (24b) comprising said image.

9. Projector according to claim 8, said projector further comprising
- a lens (38) projecting said first bundle (24h) into the direction of the projection region (12),
- where said first bundle (24b) is projected only through a central portion of said lens (38),
- and where said alerting image (22) is projected also through a peripheral portion of said lens (38).

10. Projector according to claim 8, where said light valve unit (30, 30a, 30b) comprises
- a digital mirror device (32) comprising a plurality of movable micro-reflectors, said digital mirror device (32) being operable to modulate said light to create said first bundle (24b),
- and at least one reflective surface (40, 40a, 40b) located adjacent to said digital mirror device (32) with regard to the beam direction of said light,
- where said reflective surface (40, 40a, 40b) is arranged such that said light is reflected at said surface and projected into said alerting region (20).

11. Method for operating a projector, where
- laser light is generated and projected into a direction of a projection region (12) to generate a projected image (12) filling said projection region,
- and an alerting image (22) is projected into a direction outside of said projection region,
- where the alerting light used to generate said alerting image of a wave length visible to the human eye, and of an intensity of eye-safe level,
- wherein said alerting light used for generating said alerting image(22) originates from said laser light source.

12. Projector according to claim 1, where said alerting image (22) is pulsating.

13. Projector according to claim 1, where said alerting image (22) is time-variant.

* * * * *